US011248918B2

(12) United States Patent
Saavedra Román

(10) Patent No.: US 11,248,918 B2
(45) Date of Patent: Feb. 15, 2022

(54) INTEGRATED TRAINING NAVIGATION SYSTEM

(71) Applicant: Toyota Motor North America, Inc., Plano, TX (US)

(72) Inventor: José Guillermo Saavedra Román, The Colony, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 188 days.

(21) Appl. No.: 16/542,867

(22) Filed: Aug. 16, 2019

(65) Prior Publication Data

US 2021/0048300 A1 Feb. 18, 2021

(51) Int. Cl.
*G01C 21/34* (2006.01)

(52) U.S. Cl.
CPC ..... *G01C 21/3415* (2013.01); *G01C 21/3476* (2013.01); *G01C 21/3492* (2013.01)

(58) Field of Classification Search
CPC ............ G01C 21/3415; G01C 21/3476; G01C 21/3492; G01C 21/3423
See application file for complete search history.

(56) References Cited

U.S. PATENT DOCUMENTS

| 9,068,844 | B2* | 6/2015 | Kahn | ................... | G01C 21/165 |
| 9,261,374 | B2 | 2/2016 | Mudinger et al. | | |
| 9,432,944 | B1 | 8/2016 | Benegal et al. | | |
| 10,192,164 | B2 | 1/2019 | Faith et al. | | |
| 10,200,822 | B2 | 2/2019 | Su et al. | | |
| 10,237,696 | B2 | 3/2019 | Soffer et al. | | |
| 2012/0295639 | A1 | 11/2012 | Fitoussi et al. | | |
| 2013/0046456 | A1* | 2/2013 | Scofield | ............. | G01C 21/3423 |
| | | | | | 701/117 |
| 2013/0073202 | A1* | 3/2013 | Zheng | .................... | G06N 20/00 |
| | | | | | 701/468 |
| 2013/0212176 | A1 | 8/2013 | Koulomzin et al. | | |
| 2016/0091329 | A1 | 3/2016 | Wicker | | |
| 2016/0127873 | A1 | 5/2016 | Yoon et al. | | |
| 2016/0298977 | A1* | 10/2016 | Newlin | .................. | G01C 21/20 |
| 2017/0325069 | A1 | 11/2017 | Turner et al. | | |
| 2018/0090143 | A1 | 3/2018 | Saddler et al. | | |
| 2018/0188065 | A1* | 7/2018 | Brooks | .................. | G01C 21/20 |
| 2018/0211337 | A1 | 7/2018 | Ghaddar et al. | | |

(Continued)

*Primary Examiner* — Marthe Y Marc-Coleman
(74) *Attorney, Agent, or Firm* — Christopher G. Darrow; Darrow Mustafa PC

(57) ABSTRACT

System, methods, and other embodiments described herein relate to creating and managing a route having an integrated exercise segment. In one embodiment, the navigation device provides improved integrated route creation, management and navigation capabilities by determining, according to map data, a route plan between a starting point and a destination such that the route plan includes an exercise segment that a user will manually traverse with a navigation device and a transportation segment over which the user will be transported as a passenger, determining a position of the navigation device while the user traverses the exercise segment, and transmitting, through a communication system of the navigation device, a request for transportation to complete the transportation segment based at least in part on the position of the navigation device while the user is traversing the exercise segment.

18 Claims, 4 Drawing Sheets

(56) References Cited

U.S. PATENT DOCUMENTS

2018/0231386 A1\* 8/2018 Bellotti .............. G01C 21/3423
2018/0350024 A1    12/2018 Kaurman
2020/0363219 A1\* 11/2020 Rabinowitz ........ G01C 21/3423
2021/0049910 A1\*  2/2021 Wood ..................... G08G 1/163

\* cited by examiner

INTEGRATED TRAINING NAVIGATION SYSTEM

TECHNICAL FIELD

The subject matter described herein relates, in general, to a system and method for creating a route plan for a trip, and, more particularly, to creating a route plan that includes an integrated training segment that a user manually traverses.

BACKGROUND

Health consciousness is increasing, as are "green" modes of travel, such as bicycle sharing and jogging. A daily commute to work can be an opportunity to implement a daily exercise routine, e.g., by jogging or bicycling to work. However, many people cannot take advantage of the opportunity for various reasons. The commute distance may be too long for a person to traverse in their current physical condition, or may take too long, or may be along a high traffic route that is ideal not for jogging or bicycling, etc. Accordingly, incorporating an exercise regimen into a daily commute remains an inaccessible option for most people.

SUMMARY

The disclosed devices, systems and methods relate to creating and optimizing a route plan that includes a transportation segment over which the user will be transported as a passenger and an integrated training segment that user manually traverses, e.g., as part of an exercise regimen.

In one embodiment, a navigation device, includes a communication system, a storage system that stores map data, a positioning system that determines a position of the navigation device, one or more processors, and a memory communicably coupled to the one or more processors and storing: a routing module including instructions that when executed by the one or more processors cause the one or more processors to determine, according to the map data, a route plan between a starting point and a destination such that the route plan includes an exercise segment that a user will manually traverse with the navigation device and a transportation segment over which the user will be transported as a passenger, and a tracking module including instructions that when executed by the one or more processors cause the one or more processors to transmit, through the communication system and based at least in part on the position of the navigation device while the user is traversing the exercise segment, a request for transportation to complete the transportation segment.

In another embodiment, a method of creating and managing a route having an integrated exercise segment, includes determining, according to map data, a route plan between a starting point and a destination such that the route plan includes an exercise segment that a user will manually traverse with a navigation device and a transportation segment over which the user will be transported as a passenger, determining a position of the navigation device while the user traverses the exercise segment, and transmitting, through a communication system of the navigation device, a request for transportation to complete the transportation segment based at least in part on the position of the navigation device while the user is traversing the exercise segment.

In still another embodiment, a non-transitory computer-readable medium for creating and managing a route having an integrated exercise segment includes instructions that, when executed by one or more processors, cause the one or more processors to determine, according to map data, a route plan between a starting point and a destination such that the route plan includes an exercise segment that a user will manually traverse with a navigation device and a transportation segment over which the user will be transported as a passenger, determine a position of the navigation device while the user traverses the exercise segment, and transmit, through a communication system of the navigation device, a request for transportation to complete the transportation segment based at least in part on the position of the navigation device while the user is traversing the exercise segment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with creating and optimizing a route plan that includes a transportation segment over which the user will be transported as a passenger and an integrated training segment that user manually traverses are disclosed. As previously mentioned, a user may wish to take advantage of a daily commute to exercise while covering the distance. Aside from a commute, a user may desire to incorporate exercise into a trip to a destination.

Therefore, a navigation device, system and associated methods are disclosed herein that provides an approach to creating and optimizing a route plan having at least one integrated exercise segment that allows the user to partake in physical activity while traversing the route. The disclosed embodiments can further maintain a log of exercise segments completions and/or attempts by a user and create subsequent exercise segments to implement a training regimen that matches and/or challenges the user's ability. The disclosed embodiments can further incorporate social aspects that can improve the user's progress, such as creating a route plan that includes an exercise segment that coincides with another user of similar ability to allow multiple users to complete an exercise segment together. As will be discussed below, in creating the route plan and integrated exercise segment the disclosed navigation device can take various factors into account, including street traffic, foot traffic, un-impeded stretches, uphill/downhill grade, and the like. In addition, in one or more embodiments the disclosed navigation device can transmit different types of requests to external systems (e.g., transport vehicles, crossing lights) based at least in part on a position and/or progression of user within an exercise segment.

Figure 1:
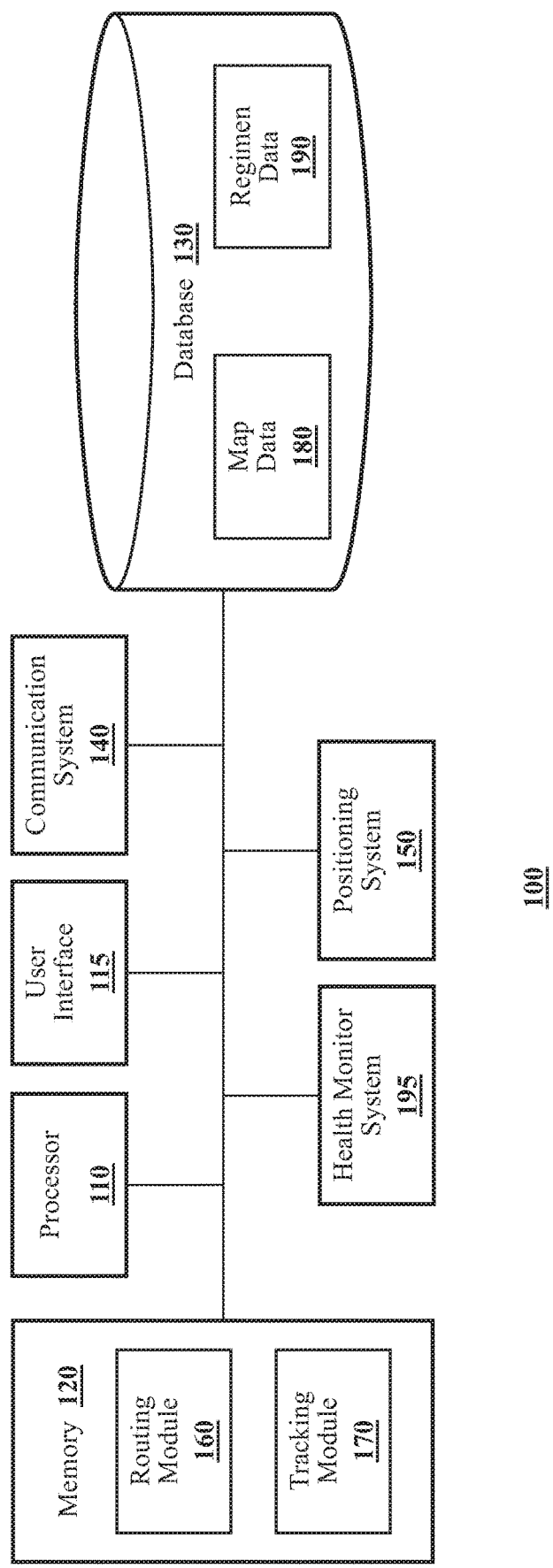
FIG. 1 illustrates one embodiment of a navigation system according to the disclosed embodiments.

Referring to FIG. 1, one embodiment of a navigation device 100 is illustrated. The navigation device 100 can be implemented, for example, as a mobile device or a wearable device, such as a smart watch capable of connecting to a central system. In one or more embodiments the navigation device 100 can also be used for granting access, or in one or more configurations, supplying payment information, to shuttle services or public transportation (e.g., train, subway, taxi, etc.) so the user need not carry addition payment methods. The navigation device 100 is shown as including a processor 110, a user interface 115, a memory 120, database 130, a communication system 140, a positioning system 150 and a health monitoring system 195. In other embodiments more or fewer components than those shown can be included according to an implementation of the disclosed subject matter.

In one or more embodiments, the processor 110 may be a part of the navigation device 100, or the navigation device 100 may access the processor 110 through a network communication. The user interface 115 can include an input device, such as a touch screen, keypad, scroll wheel, or the like, and one or more output devices, such as one or more screens, haptic devices, and audible devices. In one or more embodiments the input device and the output device can be one and the same, e.g., in a touch screen. In one or more embodiments the user interface 115 can be configured to communicate with one or more external devices to receive input/display output.

The memory 120 can store, among other things, a routing module 160 and a tracking module 170, which will be described further below. The memory 120 can be implemented as a random-access memory (RAM), read-only memory (ROM), a hard-disk drive, a flash memory, or other suitable memory for storing the modules 160 and 170.

The database 130 can store, among other information, map data 180 and regimen data 190, which will be described in turn further below. The database 130 is, in one or more embodiments, an electronic data structure that can be integral with the navigation device 100, a removable memory device that can be installed in or removed from the navigation device 100, or another network-based data store that is accessible to modules 160 and 170 stored in the memory 120. The database 130 is configured with routines that can be executed by the processor 110 for analyzing stored data, accessing and providing stored data, organizing stored data, and so on. Thus, in one embodiment, the database 130 stores data, such as map data 180 and regimen data that is used by modules 160 and 170 in executing various functions, as well as other types of data.

The communication system 140 can be, for example, a wireless communication system including one or more transmitting/receiving devices, one or more transmitting/receiving antennas and a controller for transmitting and receiving data over a wireless network using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

The positioning system 150 can include location determining components configured to acquire, for example, latitude, longitude, altitude, geocode, course, direction, heading, speed, universal time (UTC), date, and/or various other information/data. In one or more embodiments, the positioning system 150 can acquire information/data, sometimes known as ephemeris information/data, by identifying a number of satellites in view and relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Global Navigation Satellite System (GLONASS), Indian Regional Navigational satellite systems, and/or the like. The information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the navigation device 100 position in connection with a variety of other systems, including cellular towers, Wi-Fi access points, and/or the like.

Furthermore, the positioning system 150 may include indoor positioning aspects, such as components configured to use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, NFC transmitters, and/or the like. The positioning system 150 can also include one or more sensors, including one or more accelerometers, one or more gyroscopes, an inertial measurement unit (IMU), a dead-reckoning system, and/or other suitable sensors to aid in detecting movement and determining a location according to detected movement.

In addition, in one or more embodiments the navigation device can include a health monitoring system 195. The health monitoring system 195 can include one or more sensors that detect health-related attributes of the user, such as temperature, heart rate, breathing rate, etc., and generate output health data that indicates a status of the health-related attributes. The health data can be associated with an exercise segment as part of the regimen data 190, but can also be monitored by the tracking module 170 for signs of health-related emergencies. For example, if the tracking module 170 determines, based on the health data, that one or more of the user's temperature, heart rate and breathing rate are above first health threshold limit, the tracking module 170 can generate a notification to the user indicating that the user should consider stopping the exercise segment early and providing an option for the user to confirm ending the exercise segment immediately and requesting transportation. Data obtained from monitoring vital signs (e.g. heart rate) can also be used to estimate performance and fitness level of the user, which can be used as inputs to determining route plans according to the fitness levels and goals of the user.

A "route plan" as used herein generally refers to a path of travel for a trip between a starting point and a destination. A route plan can be intended for or associated with a user of the disclosed navigation device 100. That is, the route plan can be created taking into account one or more aspects or traits of the individual user that the route plan is created for. In one or more embodiments the user can input, via the user interface 115, the starting point and the destination that are used to define the beginning and ending locations of the route plan. In determining a route plan for execution, in one or more embodiments the navigation device 100 can generate multiple route plans and allow the user to select which route plan will be executed.

A "transportation segment" of a route plan, as used herein, refers to a portion of a route plan that the user traverses as a transportation passenger, e.g., as a passenger in a rideshare vehicle, taxi, e-taxi, shuttle, bus, train, or other passenger transportation vehicle. Generally, as a passenger little to no physical activity is required of the user while traversing a transportation segment.

An "exercise segment" of a route, as used herein, refers to a segment of a route plan that a user traverses manually, that is, by means of a physical activity, such as walking, jogging, bicycling, etc. Generally, physical effort is required by the user to traverse an exercise segment. In one or more embodiments, the user carries or wears the navigation device 100 while traversing the exercise segment to enable execution of various functions and/or features that will be described in detail below.

Figure 2:
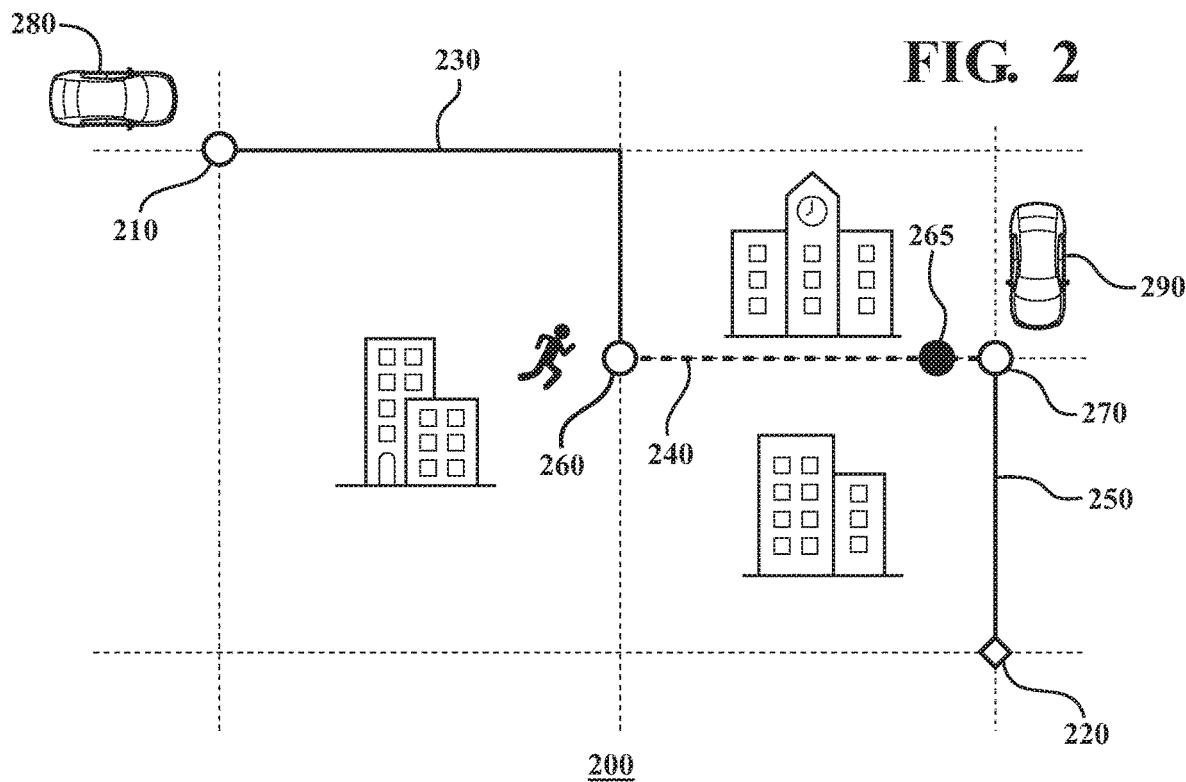
FIG. 2 illustrates one example route plan according to the disclosed embodiments.

FIG. 2 shows an example route plan 200 for a trip traveling from a starting location 210 to a destination 220. The route plan 200 includes a first transportation segment 230, an exercise segment 240, and a second transportation segment 250. In execution, the user traverses the first transportation segment 230 as a passenger, e.g., in a first rideshare vehicle 280, from the starting location 210 to a first checkpoint 260. At the first checkpoint 260 the user proceeds to traverse the exercise segment 240 by means of physical activity, (e.g., jogging, bicycling, etc.), to reach the second checkpoint 270. In one or more embodiments, the route plan 200 and/or a relevant portion of it can be displayed on the user interface 115 for the user to follow. As will be described further below, as the user approaches the end of the exercise segment 240 the navigation device 100 automatically arranges for the resumption of passenger transportation for the user at the second checkpoint 270, e.g., via a second ride-share vehicle 290. The user proceeds to traverse the second transportation segment 250 to the destination 220 as a passenger, and the trip is complete.

Referring back to FIG. 1, the modules 160 and 170 can be, for example, constructed as computer-readable instructions that when executed by the processor 110 cause the processor 110 to perform the various functions disclosed herein.

The routing module 160 generally includes instructions that function to control the processor 110 to create a route plan between a starting point and a destination such that the route plan includes at least one exercise segment and at least one transportation segment. The route plan can therefore include multiple exercise segments and multiple transportation segments. In one or more embodiments, the routing module 160 can generate multiple route plans and select and recommend a route plan for a user based on various criteria, or display, via the user interface 115, multiple route plans to the user for selection by the user, and execute the selected/recommended route plan.

In one or more embodiments, the database 130 can store map data 180 that the routing module 160 uses as a reference for creating the route plan. That is, the routing module 160 can create the route plan based on one or more paths available between a starting point and a destination as indicated by the map data 180. In one or more embodiments the navigation device 100 can be preloaded with the map data 180 and/or can obtain/update the map data 180 from an external source.

The map data 180 can include data that defines maps of one or more geographic areas or regions. In some instances, the map data 180 can include information or data on roads, traffic control devices, road markings, bike lanes, structures, features, and/or landmarks in the one or more geographic areas. The map data 180 can be in any suitable form. In some instances, the map data 180 can include image data showing aerial views of an area. In some instances, the map data 180 can include image data showing ground views of an area, including 360-degree ground views. The map data 180 can indicate measurements, dimensions, distances, and/or other information for one or more objects included in the map data 180 and/or relative to other objects included in the map data 180.

In one or more arrangements, the map data 180 can further include one or more terrain maps. The terrain map(s) can include information about the ground, terrain, roads, surfaces, and/or other features of one or more geographic areas. The terrain map(s) can include elevation data and road grade data in the one or more geographic areas. The terrain map(s) can further indicate characteristics of one or more ground surfaces, such as indicating paved roads, unpaved roads, open land, and other characteristics of a ground surface.

In one or more arrangements, the map data 180 can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills, etc. The static obstacles can be objects that extend above ground level. The one or more static obstacles included in the static obstacle map(s) can include location data, size data, dimension data, material data, and/or other data associated with it. The static obstacle map(s) can include measurements, dimensions, distances, and/or information regarding one or more static obstacles.

In creating the route plan, the routing module 160 can optimize the route plan, for example, for a given physical activity and/or for a given user. For example, based on the map data 180, the routing module 160 can evaluate multiple routes between a starting point and a destination and further evaluate multiple positions for one or more exercise segments within each of the routes in order to identify an optimal route plan. The routing module 160 can select a route plan from among multiple potential route plans based at least in part on criteria such as the type of physical activity that the user will engage in, the level of difficulty appropriate for the user, and contextual data such as number of intersections, number of hard turns, street traffic and foot traffic along different potential routes, etc. For example, in one or more embodiments, the routing module 160 can create a route plan based at least in part on the locations of bicycle sharing stations to enable the user to easily obtain/return a bicycle for the exercise segment of the route plan. As another example, in one or more embodiments the routing module 160 can create a route plan based at least in part on locations of public infrastructure that are ideal for a parkour route.

In one or more embodiments, the routing module 160 can optimize the route plan based on the map data 180, traffic data (i.e., to refine ETA), weather data (e.g., the user may or may not prefer to run while it is raining), traffic infrastructure information (e.g., traffic light behavior patterns) and also user profile information. User profile information can be set by the user to identify various preferences, such as preferred types of environments, whereabouts of contacts that the user has in a social training platform as described below, etc. In one or more embodiments, the user profile information can be set or updated directly by the user or learned by the routing module 160, e.g., based on the characteristics of route plans approved by the user over time.

In one or more embodiments, the user can input a desired ETA that the routing module 160 can use as at least part of a basis for creating the route plan.

In one or more embodiments, the route plan can include multiple exercise segments, positioned to include a rest checkpoint at a facility. The facility can be, for example, a gym that the user is a member at, a public gym, a smoothie shop, or some other facility designated by the user.

Furthermore, in one or more embodiments, the database 130 can store regimen data 190 associated with the user that tracks a physical activity training regimen in progress by the user. Regimen data 190 can include a log or record of one or more exercise segments that the user has completed or attempted to complete. The regimen data 190 can further include timestamp data and other details associated with the prior exercise segments, such as length, grade, a rating by the user, a completion percentage, a completion time, a difficulty score, type of activity, etc. Accordingly, in addition to the criteria described above, the routing module 160 can further determine an appropriate route plan and exercise segment based at least in part on the regimen data 190 associated with a user.

Figure 3:
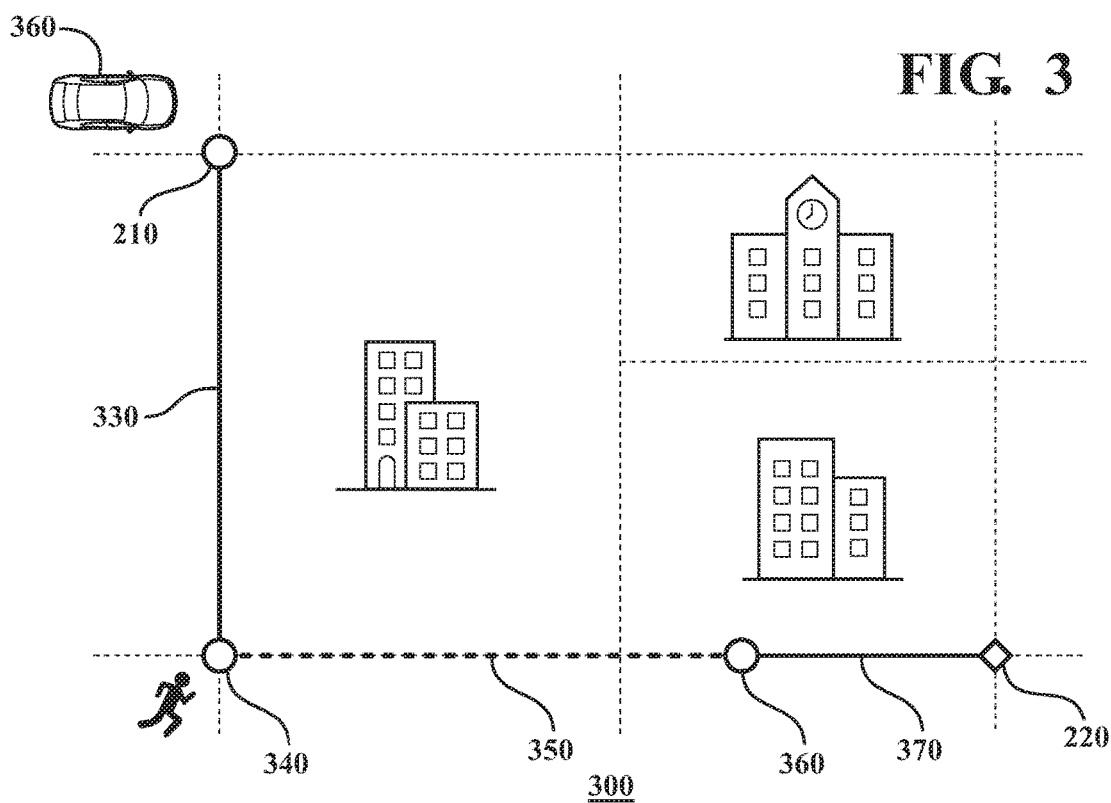
FIG. 3 illustrates another example route plan according to the disclosed embodiments.

For example, FIG. 3 shows an alternate example route plan 300 for a trip between the same starting location 210 and destination 220 shown in FIG. 2. The route plan 300 includes a first transportation segment 330 (from starting location 210 to checkpoint 340), an exercise segment 350 (from checkpoint 340 to checkpoint 360), and a second transportation segment 370 (from checkpoint 360 to destination 220). In an example scenario, a user can input, via the user interface 115, the starting location 210 and destination 220 and request a route plan including, e.g., a jogging exercise segment. The trip from the starting location 210 to the destination 220 can represent, for example, a commute between a home location and a job location for the user.

In response to the inputted request for a route plan from 210 to 220, the routing module 160 can generate multiple potential route plans, including route plans 200 and 300 as shown in FIGS. 2 and 3. At an initial stage of a training regimen associated with user, as indicated by regimen data 190, the routing module 160 can recommend route plan 200 with exercise segment 240, based at least in part on the regimen data 190 indicating that a relatively low difficulty level exercise segment is appropriate for the user. At a later stage of the training regimen, e.g., after the regimen data 190 indicates that the user has competed the exercise segment 240 multiple times with constant or decreasing completion times, the routing module 160 can recommend route plan 300, which includes a higher difficulty exercise segment 350.

In addition, in one or more embodiments the routing module 160 can further optimize the route plan by pairing the user with one or more other second users who are at a similar exercise difficulty level who have opted in to be open for exercise pairing. For example, the routing module 160 can transmit the exercise segment to an external system, such as a cloud server that provides an exercise matching service or to other navigation devices in the area. The routing module 160 can receive a communication from the external system indicating one or more nearby existing second exercise segments associated with second users and the times that the one or more second users are scheduled to begin their respective exercise segments. The routing module 160 can further transmit a difficulty rating for the exercise segment and in response, receive one or more second exercise segments with a similar difficulty rating.

The routing module 160 can adjust the route plan such that the exercise segment coincides with one of the one or more second exercise segments. That is, for example, the routing module 160 can select a second exercise segment that most matches in terms of location and difficulty level and create the route plan to include an exercise segment that matches the second exercise segment. In one or more embodiments, the routing module 160 can transmit a notification to the second user indicating that the user will be joining the second user for a matching exercise segment. Thus, the disclosed navigation device 100 can improve the exercise experience for users that exercise better with partners and are interested in meeting new people.

In one or more embodiments, the user can further transmit a location to the external system (e.g., a scheduled travel location), and the external system can actively manage social encounters by analyzing the route plans and schedules of participating users and assess situations that include similar targets of training (e.g., easy jog or intense interval running) and/or similar whereabouts (based on schedule/route plans) so the system can forecast feasible encounters (e.g., based on similar training levels, scheduling) and propose such encounters in advance. If the user confirms a proposed encounter, the routing module 160 can create and schedule a route plan for the user accordingly. This feature can improve situations, for example, in which a user is traveling for business, by being able to identify in advance possible partner training encounters in the area the user is visiting temporarily and informing the user of places/routes that better match the user's preferences for training during the visit.

As previously mentioned, the disclosed navigation device 100 can also transmit various types of requests to external systems based at least in part on a position and/or progression of the user, carrying the navigation device 100, within an exercise segment. For example, referring back to FIG. 1, the tracking module 170 can generally include instructions that function to control the processor 110 to transmit, through the communication system 140, a request for transportation to complete the transportation segment based on a position of the navigation device 100 when the user is traversing the exercise segment.

Referring to FIG. 2, for example, as the user traverses the exercise segment 240, the tracking module 170 can contact a passenger transport vehicle 290 (e.g., a rideshare vehicle, e-taxi, or the like) to request a pickup at checkpoint 270 when the positioning system 150 indicates that the user has crossed a threshold point 265. In one or more embodiments, the threshold point 265 can be set as a predetermined distance from the subsequent pickup location (i.e., in this example checkpoint 270) or can be dynamically determined based on an estimated time of arrival (ETA) of the user at the subsequent pickup location according to the pace of the user. For example, the tracking module 170 can continually or periodically determine the user's ETA at the pickup location based on the user's speed and the remaining distance of the exercise segment, and when the ETA reaches a threshold value (e.g., of ten minutes) transmit the transportation request. By transmitting the request while the user is traversing the exercise segment but nearing the pickup location the tracking module 170 can reduce a wait time of the user upon arrival at the pickup location.

In one or more embodiments, prior to transmitting the request for transportation, the tracking module 170 can provide a notification on the user interface 115 indicating details of the transportation request and providing an option to extend the exercise segment. The notification display can be accompanied by a sound, vibration, or other means to alert the user. The tracking module 170 can wait for a predetermined amount of time for a response from the user before transmitting the transportation request.

Figure 4:
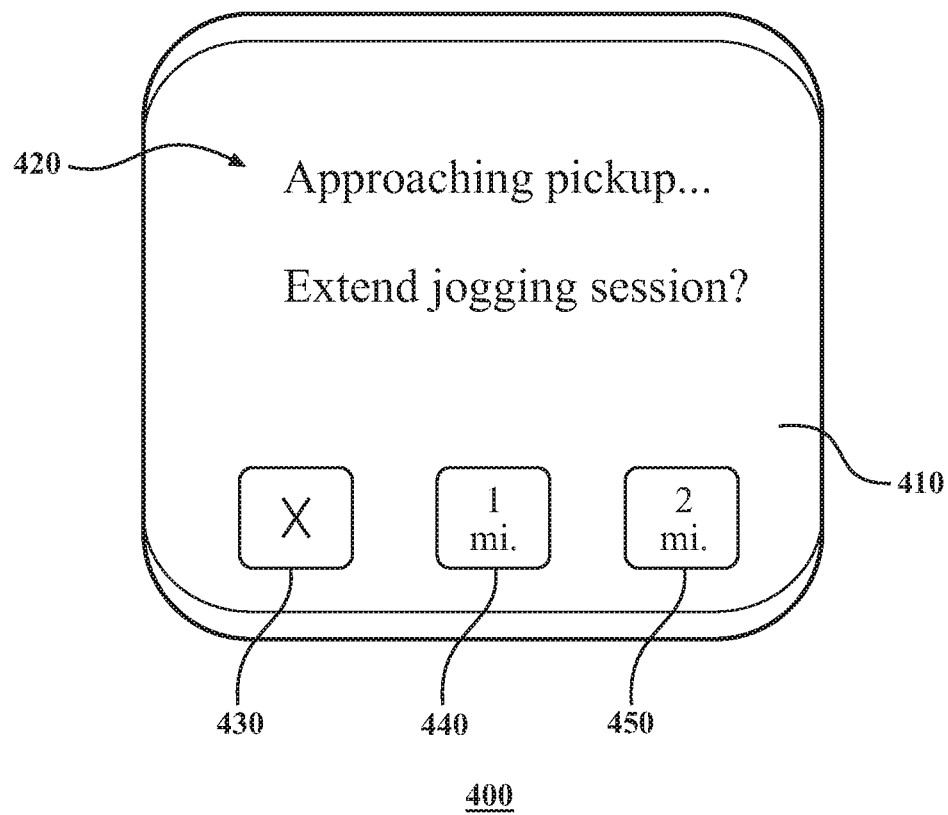
FIG. 4 illustrates an example user interface according to the disclosed embodiments.

FIG. 4 illustrates an example notification display 400. That is, for example, in one or more embodiments the user interface 115 is implemented as a screen 410 that displays a notification 420, e.g., "Approaching pickup . . . . Extend jogging session?" with response options 430, 440, 450, that allow a user to decline or to indicate an extension distance. It should be understood that notification 420 and response options 430, 440, 450 are merely one example shown to aid in providing an understanding of the disclosed embodiments. The exact configuration of the notification 420, layout and the response options 430, 440, 450, etc., can vary in implementation.

In one or more embodiments, if the user does not respond within the predetermined amount of time, the tracking module 170 can proceed to transmit the transportation request. In one or more embodiments, if the user inputs an indication that the user would prefer to extend the exercise segment, the routing module 160 can dynamically adjust the existing route plan, for example, according to the map data 180, to extend the exercise segment. That is, for example referring to FIG. 2, if upon reaching threshold point 265 the user indicates a preference to extend the exercise segment 240, the routing module 160 can determine an adjustment to the route plan 200, e.g., by shifting the checkpoint 270 farther away. The adjusted route plan, and/or a relevant portion thereof, can be displayed on the user interface 115 for the user to follow.

Conversely, at any time during traversal of an exercise segment a user can input an indication that she/he would prefer to cut the exercise segment short. Upon receiving this input, the tracking module 170 can immediately transmit a transportation request to obtain transportation from the current location of the navigation device 100 to the designated destination.

In one or more embodiments, the tracking module 170 can further be configured to help to avoid collisions while the user is training, for example, by providing warnings/notifications (e.g., visual, audible, or haptic) when the user is approaching an intersection, bike lane, or the like. Furthermore, where available the tracking module 170 can transmit requests to infrastructure, such as traffic signals, to request to cross a street when the navigation device 100 is within a threshold distance of the traffic signal in order to allow the user to maintain a steady pace.

Figure 5:
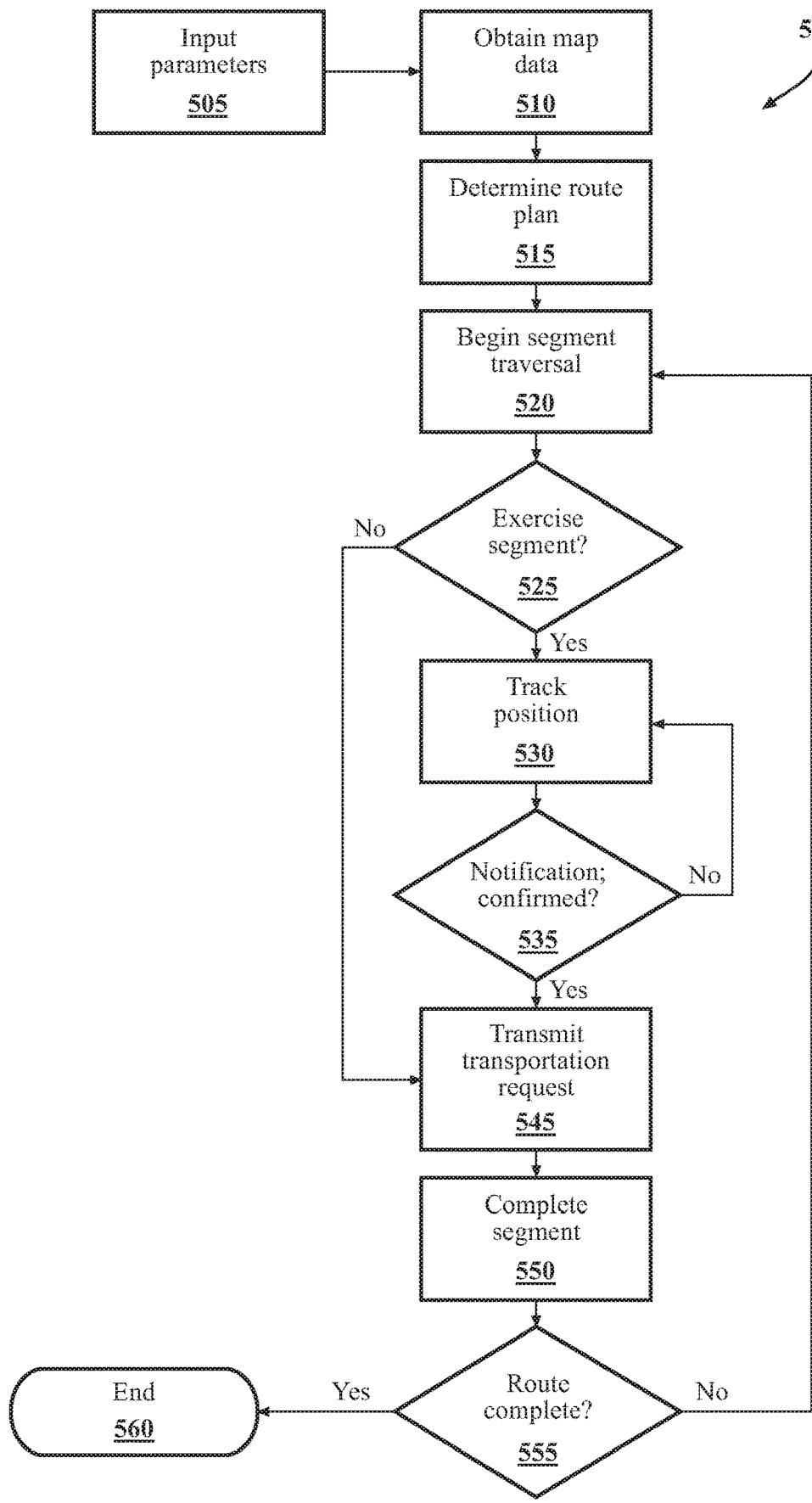
FIG. 5 illustrates a flow chart of a route plan creating and managing process according the disclosed embodiments.

FIG. 5 illustrates a flowchart of a method 500 of creating and managing a route plan for a trip according to the disclosed embodiments. Method 500 will be discussed from the perspective of the navigation device 100 of FIGS. 1 and 2. While method 500 is discussed in combination with the navigation device 100, it should be understood that the method 500 is not limited to implementation within the navigation device 100, which is merely one example of a system that may implement the method 500. It should further be understood that the order of operations can change in various implementations of the method 500.

At operation 505 the user inputs preference parameters for the trip. The preference parameters can include one or more of a starting location, a destination, a preferred type of physical activity, a preferred arrival time, a preferred number of rests, a preferred rest facility, a preference to exercise with other users, an exercise difficulty preference, as well as other parameters.

At operation 510 the routing module 160 obtains map data 180. The map data 180 can be preloaded in the database 130 or can obtained in any of various ways, such as downloading from a cloud-based server or received from installation of a memory card or other storage device that contains the data.

At operation 515 the routing module 160 determines the route plan, including the locations of the checkpoints that define one or more transportation segments and one or more exercise segments, based at least in part on the preference parameters. In one or more embodiments, the routing module 160 further determines difficulty parameters (e.g., length, grade) for the one or more exercise segments based on regimen data 190. In one or more embodiments, the routing module 160 determines the route plan by searching the map data 180 for one or more routes between the starting location and the destination and analyzes the one or more routes to identify exercise and transportation segments that meet the preference parameters and/or the difficulty parameters. The routing module 160 can select a single route plan that best meets the parameters or can present multiple potential route plans that best meet the parameters and present the potential route plans to the user for selection.

Furthermore, as described above, in one or more embodiments to determine the route plan the routing module 160 can transmit details of an exercise segment to an external system (e.g., a cloud-based server or a different navigation device 100) as part of an exercise partner matching function. The routing module 160 can receive a second exercise segment, associated with a second user, from the external system and adjust the route plan to incorporate aspects of the second exercise segment (i.e., includes the same or similar checkpoint locations at the same or similar time). That is, the exercise segment of the route plan can coincide with the second exercise segment, allowing the user to join the second user on the same path for the exercise segment. The routing module 160 can further transmit data indicating a type of activity and difficulty level of the exercise segment, allowing the external system to match the user with a second user exercising at the same or similar level of difficulty in the same activity.

After the route plan has been determined, at operation 520, the user, carrying the navigation device 100, begins to traverse a segment of the route plan. If the segment is an exercise segment, the user engages in physical activity (e.g., walking, jogging, bicycling, etc.) to begin traversing the segment. If the segment is not an exercise segment, then the user moves to the designated checkpoint for pickup, according to the route plan.

At operation 525 the navigation device 100 determines which actions to take based on determining whether the current segment is an exercise segment or a transportation segment. If it is not an exercise segment but instead a transportation segment, at operation 545, the tracking module 170 transmits a request for transportation. For example, the tracking module 170 can transmit a request to a transportation service (e.g., a taxi or ride-share vehicle) for a pickup at the current location of the navigation device 100. The user completes traversal of the transportation segment as a passenger at operation 550.

If the segment is an exercise segment, at operation 530, the tracking module 170 tracks the position of the navigation device 100, based on the output from the position system 150. At operation 535, the tracking module 170 provides a notification to the user indicating that the tracking module is about to transmit a transportation request for pickup and checks for confirmation.

As previously described, the notification can be triggered in various ways. In one scenario when the navigation device 100 reaches a threshold point, e.g., a predetermined or dynamically determined distance from the next pickup checkpoint (e.g., point 265 in FIG. 2), the tracking module 170 can provide the notification. Alternatively, in one or more embodiments that include the health monitoring system 195, the tracking module 170 can provide the notification based on health data surpassing a health threshold. In response the user can actively confirm by responding, passively confirm by doing nothing, or respond by indicating a preference to extend/continue the exercise segment.

If the notification is not confirmed (i.e., the user prefers to extend/continue the exercise segment), the new checkpoints are set by the routing module 160, and the tracking module 170 continues to track the position at operation 530. It should be noted that the configuration of the confirmation can be adjusted by the user according to personal preference. For example, in one implementation a user may prefer to configure the navigation device 100 such that the user not responding to a notification is equivalent to rejecting the notification, thereby requiring active confirmation.

At operation 545, the tracking module 170 transmits a request for transportation, e.g., via the communication system 140. The tracking module 170 can transmit a location and time to a transportation service, e.g., a taxi or a rideshare service, to request a pickup for the user. In one or more embodiments, the route plan can utilize other types of transportation, such as buses or trains that operate on a schedule and do not require a transportation request. In such cases, the tracking module 170 can simply indicate the scheduled boarding time and station for the user to follow.

At operation 550, the user completes traversal of the segment. Completing traversal can entail different results, depending on the circumstances. For example, if the segment is a transportation segment, the user completes traversal by traversing the segment as a passenger in a transportation vehicle to arrive at the next checkpoint. (If the route plan has been adjusted, e.g., due to health concerns, the routing module 160 can set the trip destination as the next checkpoint directly.) If the segment is an exercise segment, the user completes traversal by manually proceeding to the next checkpoint. Thus, depending on the route plan and the circumstances, the next checkpoint can be, for example, a pickup point for subsequent transportation segment, a rest facility such as a gym, an adjusted pickup point set due to health concerns, a trip destination, or other position.

At operation 555, the navigation device 100 determines whether the route plan has been completed, i.e., whether the user has arrived at the trip destination. If the user has arrived at the destination, the process ends at 560. In one or more embodiments, the navigation device 100 can store details (e.g., time, distance, pace, speed, etc.) associated with the completion of the exercise segment as additional regimen data 190. If the route plan is not complete, then the process continues at operation 520, with the user traversing the next segment of the route plan (i.e., a transportation segment or an exercise segment). The process can cycle until the user reaches the destination.

Thus, the disclosed navigation device 100 can create a route plan with an integrated exercise segment and manage traversal of the route plan. The disclosed navigation device 100 can provide local training options for a user in a new area and manage a training regimen across multiple trips. The navigation device 100 can advantageously create route plans according to local geographic features such as sizes of city blocks, likely stops at red lights, etc., and align the route plan according to attributes of the exercise activity, such as positioning the exercise segment on intervals with city blocks or unimpeded long stretches in areas having relatively low traffic impediments. The disclosed navigation device 100 can automatically adjust a route plan in progress to respond to dynamic circumstances, such as a need to stop early due to a health condition, a preference to push farther in a training session, a preference to end a training session earlier, etc. The disclosed navigation device 100 can also automatically pair the user with other users of similar skill and coordinate joint exercise sessions, even when the participants have different trip destinations.

In addition, in one or more embodiments the navigation device 100 can receive or obtain traffic information/updates from an external system, such as a cloud-based server. The routing module 160 can update the route plan when the traffic information indicates an incident or occurrence that may have a negative impact on the route plan. For example, the traffic information may indicate that an accident has occurred in an area that lies on part of the route plan, or that foot traffic has greatly increased, e.g., due to a large event ending. Since accident-related road blockage or foot traffic congestion may have a negative impact on the exercise segment, the routing module 160 can alter the route plan to avoid the area.

The navigation device 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data stores of the navigation device (e.g., database 130) may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A navigation device, comprising:
a communication system;
a storage system that stores map data;
a user interface;
a positioning system that determines a position of the navigation device;
one or more processors; and
a memory communicably coupled to the one or more processors and storing:
a routing module including instructions that when executed by the one or more processors cause the one or more processors to determine, according to the map data, a route plan between a starting point and a destination such that the route plan includes an exercise segment that a user will manually traverse with the navigation device and a transportation segment over which the user will be transported as a passenger; and
a tracking module including instructions that when executed by the one or more processors cause the one or more processors to transmit, through the communication system and based at least in part on the position of the navigation device while the user is traversing the exercise segment, a request for transportation to complete the transportation segment, and prior to transmitting the request for transportation, provide a notification on the user interface and wait for a predetermined amount of time for a response from the user before transmitting the request, the notification indicating details of the request and providing an option to extend the exercise segment.

2. The navigation device of claim 1, wherein the storage system further stores training regimen data associated with the user, and the routing module further includes instructions to determine a length of the exercise segment based at least in part on the training regimen data.

3. The navigation device of claim 1, wherein the routing module further includes instructions to dynamically adjust the route plan, according to the map data, to extend the exercise segment when the user selects the option to extend the exercise segment.

4. The navigation device of claim 1, further comprising a health monitoring system that detects one or more aspects of a health of the user while the user is traversing the exercise segment and outputs health data indicating the one or more aspects, and wherein the instructions to provide the notification include instructions to provide the notification based at least in part on the health data.

5. The navigation device of claim 1, wherein the routing module further includes instructions to create the exercise segment, according to the map data, to include a rest point at a facility.

6. The navigation device of claim 5, wherein the storage system further stores training regimen data associated with the user, and the routing module further includes instructions to determine a length of the exercise segment and a position of the rest point along a length of the exercise segment based on the training regimen data.

7. The navigation device of claim 1, wherein the routing module further includes instructions to transmit the exercise segment to an external system, receive a communication from the external system indicating a second exercise segment associated with a second user, and adjust the route plan such that the exercise segment coincides with the second exercise segment.

8. The navigation device of claim 7, wherein the storage system further stores training regimen data associated with the user, and the routing module further includes instructions to transmit data, based on the training regimen data, indicating a level of difficulty of the exercise segment, and wherein the second exercise segment received in the communication has a similar level of difficulty.

9. The navigation device of claim 1, wherein the tracking module further includes instructions to transmit a request to cross a traffic signal when the position indicates that the navigation device is within a threshold distance of the traffic signal.

10. The navigation device of claim 1, wherein the routing module further includes instructions to transmit to an external system a request for traffic data, and to determine one or more paths of the route plan based at least in part on the traffic data.

11. A method of creating and managing a route having an integrated exercise segment, comprising:
determining, according to map data, a route plan between a starting point and a destination such that the route plan includes an exercise segment that a user will manually traverse with a navigation device and a transportation segment over which the user will be transported as a passenger;
determining a position of the navigation device while the user traverses the exercise segment;
transmitting, through a communication system of the navigation device, a request for transportation to complete the transportation segment based at least in part on the position of the navigation device while the user is traversing the exercise segment;
prior to transmitting the request, providing a notification on a user interface of the navigation device; and
waiting for a predetermined amount of time for a response from the user before transmitting the request, the notification indicating details of the request and providing an option to extend the exercise segment.

12. The method of claim 11, further comprising:
storing training regimen data associated with the user; and
determining a length of the exercise segment based at least in part on the training regimen data.

13. The method of claim 11, further comprising dynamically adjusting the route plan, according to the map data, to extend the exercise segment when the user selects the option to extend the exercise segment.

14. The method of claim 11, further comprising:
detecting one or more aspects the of a health of the user while the user is traversing the exercise segment; and
generating health data indicating the one or more aspects, wherein the providing the notification comprises providing the notification based at least in part on the health data.

15. The method of claim 11, further comprising:
transmitting the exercise segment to an external system;
receiving a communication from the external system indicating a second exercise segment associated with a second user; and
adjusting the route plan such that the exercise segment coincides with the second exercise segment.

16. The method of claim 15, further comprising:
storing training regimen data associated with the user; and
transmitting data, based on the training regimen data, indicating a level of difficulty of the exercise segment, to the external system, wherein the second exercise segment received in the communication has a similar level of difficulty as the exercise segment.

17. A non-transitory computer-readable medium for creating and managing a route having an integrated exercise segment, including instructions that, when executed by one or more processors, cause the one or more processors to:

determine, according to map data, a route plan between a starting point and a destination such that the route plan includes an exercise segment that a user will manually traverse with a navigation device and a transportation segment over which the user will be transported as a passenger;

transmit the exercise segment to an external system;

receive a communication from the external system indicating a second exercise segment associated with a second user;

adjust the route plan such that the exercise segment coincides with the second exercise segment;

determine a position of the navigation device while the user traverses the exercise segment; and transmit, through a communication system of the navigation device, a request for transportation to complete the transportation segment based at least in part on the position of the navigation device while the user is traversing the exercise segment.

18. The non-transitory computer-readable medium of claim 17, further including instructions to:

storing training regimen data associated with the user; and determining a length of the exercise segment based at least in part on the training regimen data.

* * * * *